United States Patent [19]
Seffernick et al.

[11] Patent Number: 5,977,648
[45] Date of Patent: *Nov. 2, 1999

[54] HYDRAULICALLY DRIVEN LOW REACTANCE, LARGE AIR GAP PERMANENT MAGNET GENERATOR AND VOLTAGE REGULATION SYSTEM FOR USE THEREWITH

[75] Inventors: George H. Seffernick; Mahesh J. Shah, both of Rockford, Ill.; Barry L. Maltby, Long Beach, Calif.

[73] Assignee: Sundstrand Corporation, Rockford, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/734,645

[22] Filed: Oct. 21, 1996

[51] Int. Cl.$^6$ .............................. F03B 13/00; F03B 13/10
[52] U.S. Cl. .................................... 290/43; 290/6; 290/9; 290/10; 290/11; 290/12; 290/31; 290/46
[58] Field of Search ................................ 290/6, 31, 9, 10, 290/11, 12, 46; 60/39.06, 39.142, 39.02, 443; 322/51, 28, 8; 310/51, 112, 114

[56] References Cited

U.S. PATENT DOCUMENTS

| | | | |
|---|---|---|---|
| 1,780,613 | 11/1930 | Bauer et al. | 290/4 |
| 2,262,560 | 11/1941 | Bryant | 290/40 |
| 2,790,091 | 4/1957 | Chapman et al. | 290/4 |
| 2,949,540 | 8/1960 | Clayton | 290/4 |
| 4,217,538 | 8/1980 | Ziemacki | 322/29 |
| 4,409,490 | 10/1983 | Caputo | 290/4 |
| 4,490,619 | 12/1984 | McMinn | 290/2 |
| 4,587,436 | 5/1986 | Cronin | 307/21 |
| 4,609,842 | 9/1986 | Aleem et al. | 310/112 |
| 4,629,033 | 12/1986 | Moore et al. | 184/6.3 |
| 4,728,841 | 3/1988 | Sugden | 310/114 |
| 4,743,776 | 5/1988 | Baehler et al. | 290/31 |
| 4,879,501 | 11/1989 | Haner | 318/645 |
| 5,033,265 | 7/1991 | Sugden | 60/444 |
| 5,077,485 | 12/1991 | Rashid | 307/84 |
| 5,184,458 | 2/1993 | Lampe et al. | 60/39.142 |
| 5,260,642 | 11/1993 | Huss | 322/51 |
| 5,722,228 | 3/1998 | Lampe et al. | 60/39.06 |

*Primary Examiner*—Elvin Enad
*Attorney, Agent, or Firm*—Marshall, O'Toole, Gerstein, Murray & Borun

[57] ABSTRACT

An electric power generating system comprises a low reactance, large airgap permanent magnet generator driven by a hydraulic motor to generate a poly-phase AC output voltage. Because the permanent magnet generator is a low reluctance, large airgap machine, the output voltage regulation is low over the desired loading range of the system. The output voltage is controlled within acceptable limits by trimming the output speed of the hydraulic motor through the use of a servovalve. The control for the servovalve senses a parameter of output power and generates a speed control signal to compensate for deviations in the generator output. The system includes protection circuitry which monitors at least one parameter of the output power. This protection circuitry generates an output protection signal in response to a deviation in the monitored parameter which exceeds predetermined limits. In response to this signal, an on/off solenoid, which is coupled between the hydraulic motor and the external source of hydraulic power, terminates the flow of hydraulic power to the hydraulic motor. This results in a termination of the power generation by the permanent magnet generator. In one embodiment of the instant invention, the permanent magnet generator includes a second stator winding which is used to generate a second output voltage. A rectification circuit is coupled to this second output to transform the voltage produced thereon to a dc voltage to power dc loads.

16 Claims, 8 Drawing Sheets

HYDRAULICALLY DRIVEN LOW REACTANCE, LARGE AIR GAP PERMANENT MAGNET GENERATOR AND VOLTAGE REGULATION SYSTEM FOR USE THEREWITH

FIELD OF THE INVENTION

The instant invention relates generally to hydraulically driven electric power generation and control systems, and more particularly to a hydraulically driven permanent magnet generator whose output is maintained within a narrow range during all loading conditions.

BACKGROUND ART

In an aircraft electrical generating system the output voltage of a main channel generator must be regulated within a narrow band of output voltage so as to not damage any of the utilization equipment to which it supplies electric power. In conventional systems, a synchronous wound field generator is used to generate the electric power needed by the utilization equipment. This type of generator is typically used because the output voltage can be regulated by controlling the generator field excitation using a generator control unit (GCU). As more electrical loads are connected to the system, the amount of excitation provided to the wound field is increased, thereby preventing an unacceptable droop in output voltage. Such a generator is constructed with a fixed exciter field winding which is driven by the GCU. The excitation provided to this fixed winding induces a voltage in a three phase rotating exciter winding located on the rotor. The output of these rotating windings are rectified by a rotating rectifier assembly to produce a dc output used to drive the rotating main field winding. This main field winding, in turn, excites the main output stator windings which supply the electric power to the utilization equipment.

A problem associated with the use of such a generator is that there are undesirable losses in the rotor resulting from the "inside-out" nature of the exciter field. These losses occur at various points between the fixed winding which inductively couples a rotating three phase winding assembly whose output is rectified by a rotating diode assembly to drive a rotating main field winding which inductively couples the main stator windings. In addition to the lower efficiency resulting from these losses, the overall machine is less robust due to stresses placed on the rotating diode assembly. The use of suppression resistors are required for the rotating rectifier assembly to protect the diodes from large voltage spikes resulting from switching and large load transients.

Figure 1:
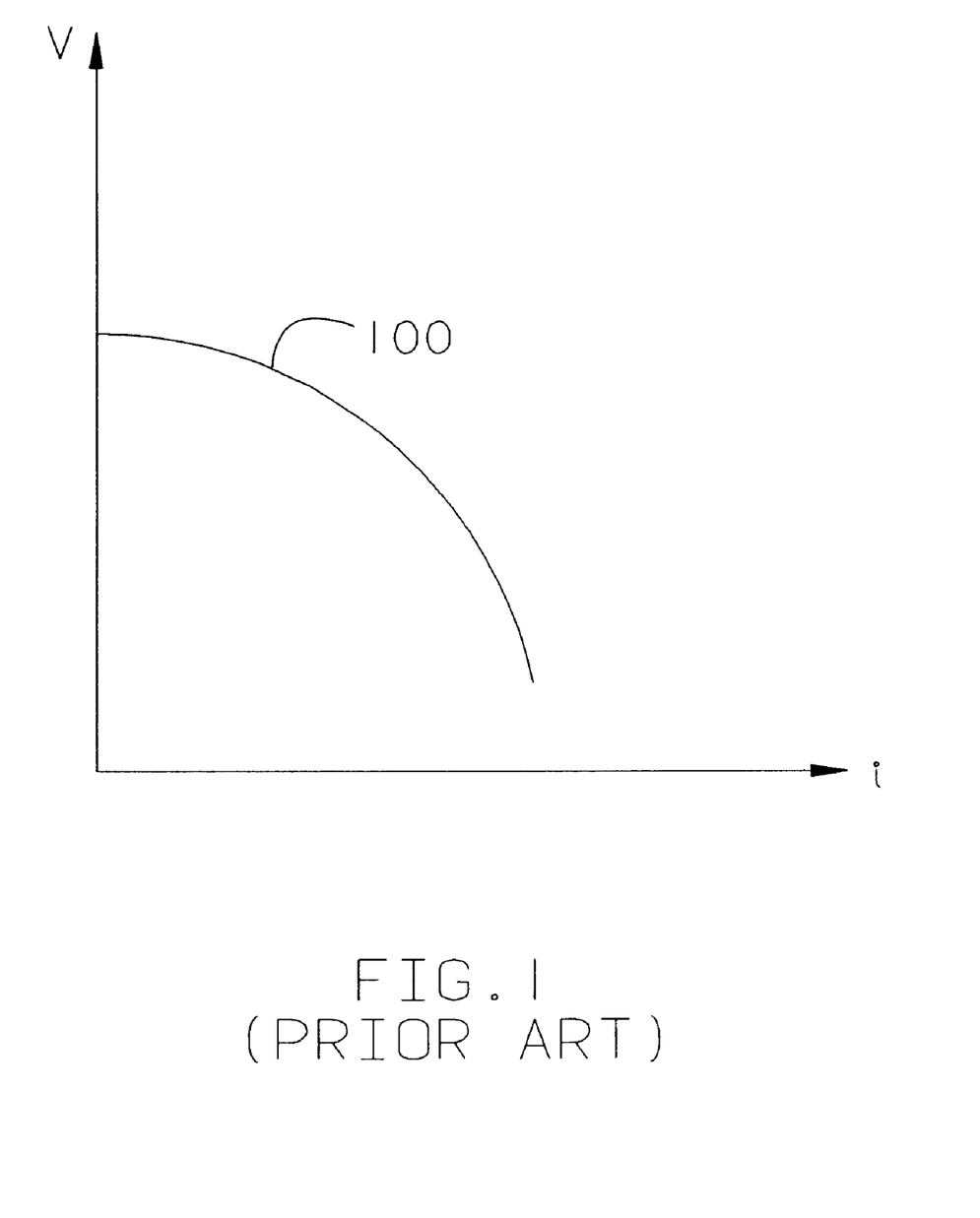
FIG. 1 is a graphical illustration of the output voltage characteristics of a typical permanent magnet generator (PMG) versus connected load.

A more robust and efficient machine is the permanent magnet generator (PMG). This type of generator uses strong permanent magnets constructed from materials such as samarium-cobalt or Nd-Fe-B (where the rotor temperature remains under 100° C.) to generate the excitation flux needed to generate electricity. These permanent magnets are placed on the rotor of the PMG and provide a fixed excitation at a given speed. The absence of the rotating windings and diode assemblies in these PMGs makes them inherently rugged, efficient, and reliable machines. The output voltage of the PMG is a function of load and operating speed of the machine. A problem inherent with such a machine, however, is that the output voltage droops rather severely at a given speed as load is connected to its output as illustrated by the graph of output voltage versus load current 100 in FIG. 1. This is because the fixed excitation from the permanent magnets does not change. One way to counteract this severe voltage droop problem is to change the speed at which the rotor of the PMG is driven. As the speed of the PMG is increased, the PMG output voltage is increased to counteract the drooping voltage. As electrical load is removed from the PMG, the speed may be decreased to suppress the rising voltage.

While this input speed/output voltage control scheme would appear to solve the problem associated with changing electrical loads, such a system to date is unable to meet the power quality specifications which govern aircraft electric power generating systems. These specifications, such as MIL-G-21480, DO-160, and MIL-STD-704, require that narrow band voltage regulation be maintained as loads are switched on and off from no load to twice the normal per unit loading as may be seen from the limits 102$_U$ and 102$_L$ for DO-160 and 104$_U$ and 104$_L$ for MIL-STD-704 of FIG. 2. These specifications also require that this voltage regulation be maintained under normal conditions with allowance for very short transient variations as may be seen from limits 106$_U$ and 106$_L$ for generator loading up to rated load, limits 108$_U$ and 108$_L$ for generator overloading up to 150% rated capacity, and limits 110$_U$ and 110$_L$ for generator loading up to 200% rated capacity. Under such loading conditions it becomes difficult to overcome the rotational inertia of the PMG's rotor to force a speed change quick enough to meet the power quality specifications for the output voltage, not to mention the possibility of shearing the shaft from the torque required to effect such a speed change.

This problem is compounded even further if the electrical system is required to utilize a hydraulic motor to drive the PMG. For this type of system, in addition to the PMG rotor inertia delaying the output voltage response to a speed change command, delays caused by valve openings and closings and the change in hydraulic fluid flow rate further delay the electrical response of the system. These delays may result in the system being tripped off-line by the system's over voltage protection during normal off load transients because the PMG's output voltage increases beyond the trip level for longer than allowed by specification. This type of situation is unacceptable, and his severely limited the application of PMGs for hydraulically driven, highly regulated systems.

It is, therefore, an objective of the instant invention to overcome these and other problems known in the art. Specifically, it is an objective of the instant invention to provide an electric power generating system which is capable of utilizing the rugged and efficient permanent magnet generator. It is further an objective of the instant invention to provide a system which controls the output of the PMG in such a manner as to allow its use in accordance with industry power quality standards. A further objective of the instant invention is to provide a PMG based electrical power generating system which is driven by hydraulic power. Additionally, it is an objective of the instant invention to provide a system which will protect against faults which could damage the utilization equipment or the PMG itself. It is a further objective of the instant invention to provide such a system using a simple and economical control scheme.

SUMMARY OF THE INVENTION

It is the principal objective of the instant invention to provide a new and improved hydraulically driven electric power generation system. More specifically, it is the principal objective of the instant invention to provide a hydraulically driven electric power generating system utilizing a low reactance, large airgap permanent magnet generator having a low output voltage regulation characteristic thereby allowing the use of a speed trimming servovalve to maintain output voltage regulation over a desired load profile.

An electric power generating system in accordance with the above objectives comprises a permanent magnet generator (PMG) having a rotor and a poly-phase wound stator. The PMG is driven by a source of rotational energy, such as a hydraulic motor, which is coupled to the rotor typically by a shaft. The system also comprises output voltage control circuitry which is in sensory communication with the output phase windings. Since the output characteristics of a PMG are dependent on rotor speed, this output voltage control circuitry adjusts the speed of the hydraulic motor to maintain the output voltage within predetermined limits as the connected load changes.

The PMG of the instant invention is designed to have a reactance low enough to produce an output voltage droops of less than 20 volts over a range of connected electrical load from zero to two per unit at a given operational speed. Specifically, the PMG of the instant invention has a low reactance such that the output voltage is maintained within a range of approximately ±5 volts over a range of connected electrical load from zero to two per unit by varying the speed of the hydraulic motor by approximately ±7% from its normal operating speed.

This speed variation is accomplished by the output voltage control circuitry which comprises sense circuitry coupled to the output phase winding for sensing a parameter of power. This parameter of power may be the output frequency, or the output voltage itself. This circuitry generates a speed trim signal in response to the sensed parameter of power deviating from a predetermined limit. For a typical aircraft electric power system, this predetermined limit is 115 volts. Once the speed trim signal is generated, a servovalve which is operably coupled to the hydraulic motor trims the speed at which the hydraulic motor drives the rotor of the PMG. This speed trim signal may be a simple "ramp-up/ramp-down" binary type signal, or may be an analog signal whose magnitude is proportional to the amount of trim required, or may be otherwise as is known in the art. Because the PMG of the instant invention is designed with a low reactance, the range of the servovalve's trim of the hydraulic motor's speed need only be approximately ±7% to maintain the output voltage regulation within the ±5 volt limits required by the industry power quality specifications.

To protect the distribution system, the connected utilization equipment, as well as the PMG itself, the instant invention provides protection circuitry. This protection circuitry monitors various parameters of the output of the PMG. One consequence of the low reactance design of the PMG is that its short circuit is very high. Since extended operation under a short circuit condition may result in damage to the distribution system as well as to the PMG itself, one protection circuit protects the PMG from this extended overcurrent operation. This circuit comprises an output current sense circuit, such as a current transformer (CT), in sensory communication with the output phase windings. These CTs monitor the output current supplied by the permanent magnet generator, and additional sense circuitry generates an overcurrent fault signal in response to this monitored output current exceeding a predetermined threshold. In response to the generation of this overcurrent fault signal, a supply control means, such as an on/off solenoid which is operatively coupled to the hydraulic motor, discontinues the supply of hydraulic power to the hydraulic motor. Additional protection is provided for over voltage operation of the PMG. The over voltage protection circuitry comprises a voltage sense circuit in sensory communication with the output phase winding for monitoring output voltage generated by the PMG. As with the over current circuitry, the output voltage sense circuit generates an over voltage fault signal in response to the output voltage exceeding a predetermined threshold. In response to this over voltage fault signal, the on/off solenoid disconnects the supply of hydraulic power to the hydraulic motor.

In a preferred embodiment of the instant invention, the PMG comprises a second output 3-phase winding which is coupled to a voltage rectifier. The output of this rectifier is a dc voltage which may be used to supply the dc connected loads. As with the main ac output, the dc voltage regulation is maintained by the servovalve trim of the input speed to the PMG.

BRIEF DESCRIPTION OF THE INVENTION

While the specification concludes with claims particularly pointing out and distinctly claiming that which is regarded as the present invention, the organization, the advantages, and further objects of the invention may be readily ascertained by one skilled in the art from the following detailed description when read in conjunction with the accompanying drawings in which:

DESCRIPTION OF THE PREFERRED EMBODIMENTS

Figure 2:
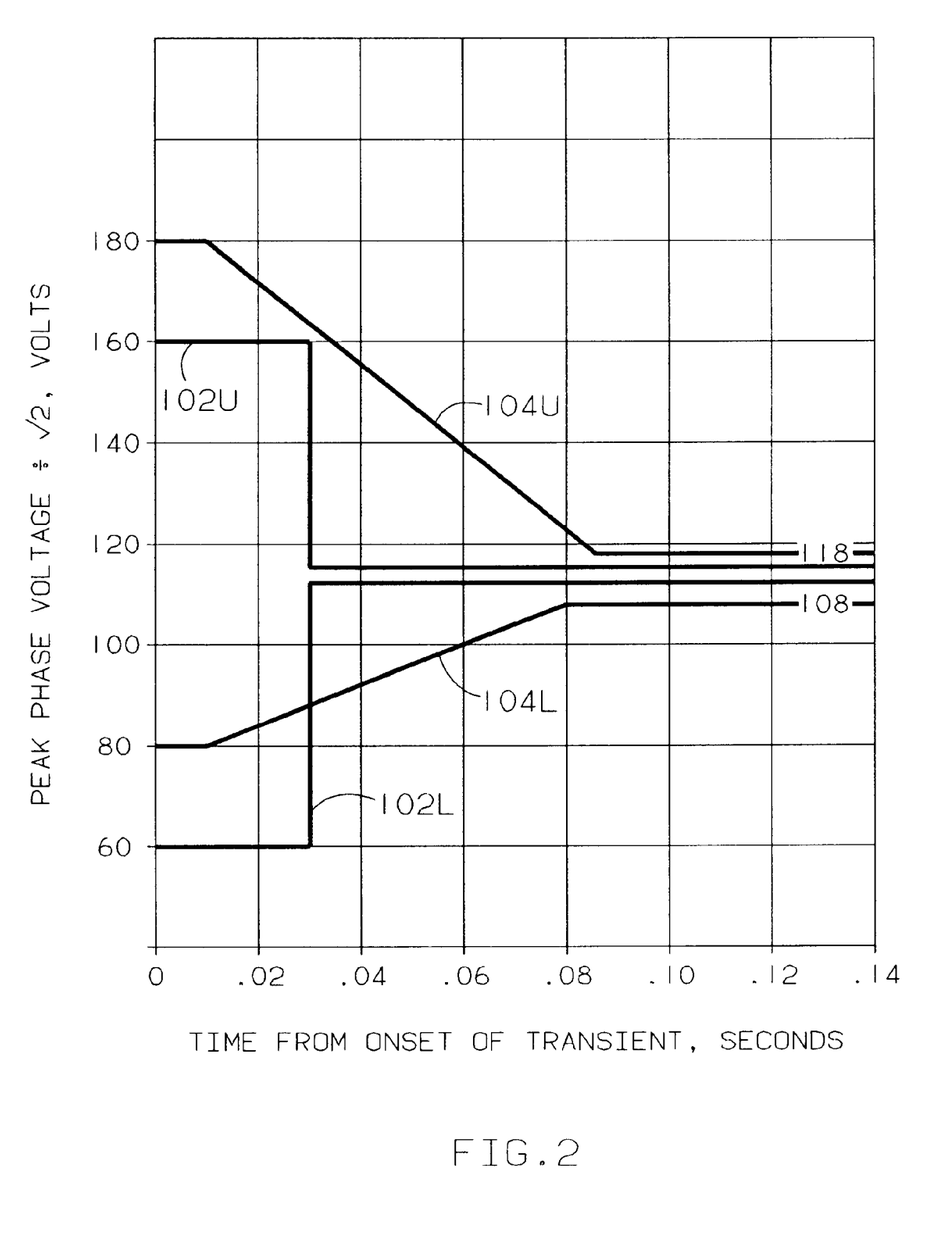
FIG. 2 illustrates the maximum voltage versus time limits for load switching voltage transients of DO-160 and MIL-STD-704.
Figure 3:
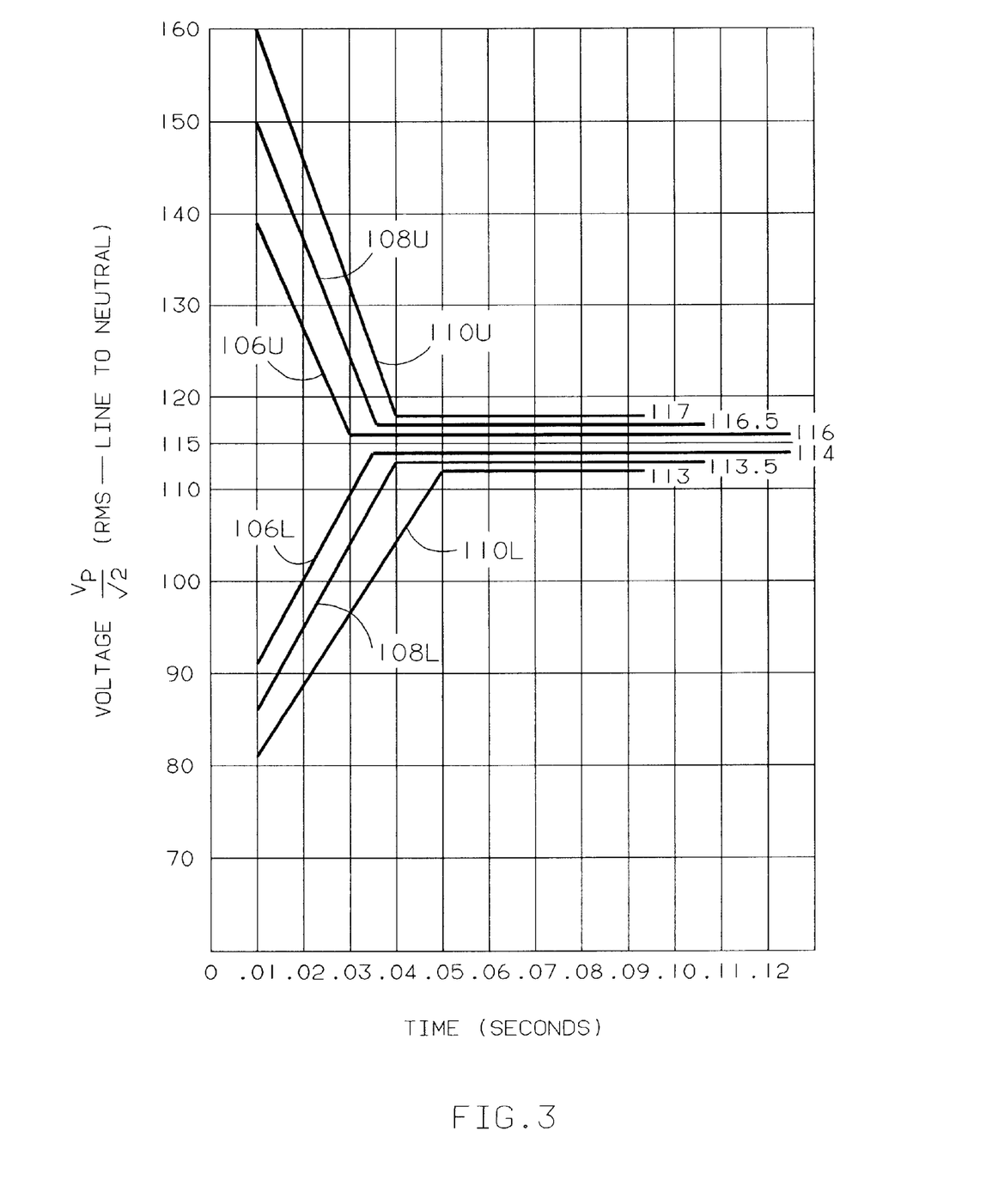
FIG. 3 illustrates the maximum voltage versus time transient and steady state voltage limits.

In a preferred embodiment of the instant invention, as illustrated in FIG. 2, an external source of hydraulic power 112, such as, e.g., an air driven generator or ram air turbine, supplies hydraulic power through an integral on/off solenoid 114 to a hydraulic motor 116. The speed of the hydraulic motor 116 may be trimmed by an externally controllable servovalve 118. The hydraulic motor 116 converts hydraulic power to mechanical rotational power having a given rotational speed which is provided by shaft 120 to a permanent magnet generator (PMG) 122. The PMG 122 is preferably a polyphase machine having a three phase ac power output 124, and at least a single phase dc output 126 (being provided by rectifying diodes 128 coupled to an additional stator winding (not shown)).

Control of this preferred embodiment is provided by speed/frequency and voltage sense means or circuitry 130 which is in sensory communication with at least one of the electrical power outputs 124, 126. This control circuitry 130 senses the PMG output and compares this sensed value to a predetermined target, e.g., 115 volts ac if output 124 is used, or 28 volts dc if output 126 is used. Any deviation between the sensed value and the target creates an error signal. This error signal may be generated and processed by conventional control methods, and is likewise conventionally transformed to a servovalve drive signal 132 which causes the servovalve 118 to either increase the speed of the hydraulic motor 116 (positive trim) or decrease the speed of the hydraulic motor 116 (negative trim).

Protection is also provided in a preferred embodiment of the instant invention by the over voltage and overcurrent protection means or circuitry 134 which is in sensory communication with at least one of the electrical power outputs 124, 126. The over voltage portion of protection circuitry 134 is conventional in design and compares the sensed voltage to an acceptable maximum limit. If the sensed voltage exceeds the acceptable maximum limit, a protection fault signal on line 136 is generated. This signal is used to drive the integral on/off solenoid 114 to the off position to disconnect the flow of hydraulic power to the hydraulic motor 116, thereby stopping the generation of electric power by the PMG 122. The value and time for the maximum limit are determined by the applicable power quality specification as described above. In addition to the over voltage protection, the protection circuitry 134 also provides conventional protection against overcurrent faults. This protection is provided by conventional means for sensing output current flow from at least one of the outputs 124, 126, such as current transformer 138. The sensed current is then compared to a maximum acceptable limit. If the supplied current exceeds this maximum limit, a protection fault signal is generated on line 136 which causes the on/off solenoid 114 to shut off the flow of hydraulic power to the hydraulic motor 116. As described above, this results in the stoppage of electric power generation by the PMG 122. The maximum value for the current is determined by system requirements for circuit breaker fault clearing and generator construction, and is typically stated as 1.5 per unit current for 5 minutes and 2.2 per unit current for 5 seconds.

Figure 4:
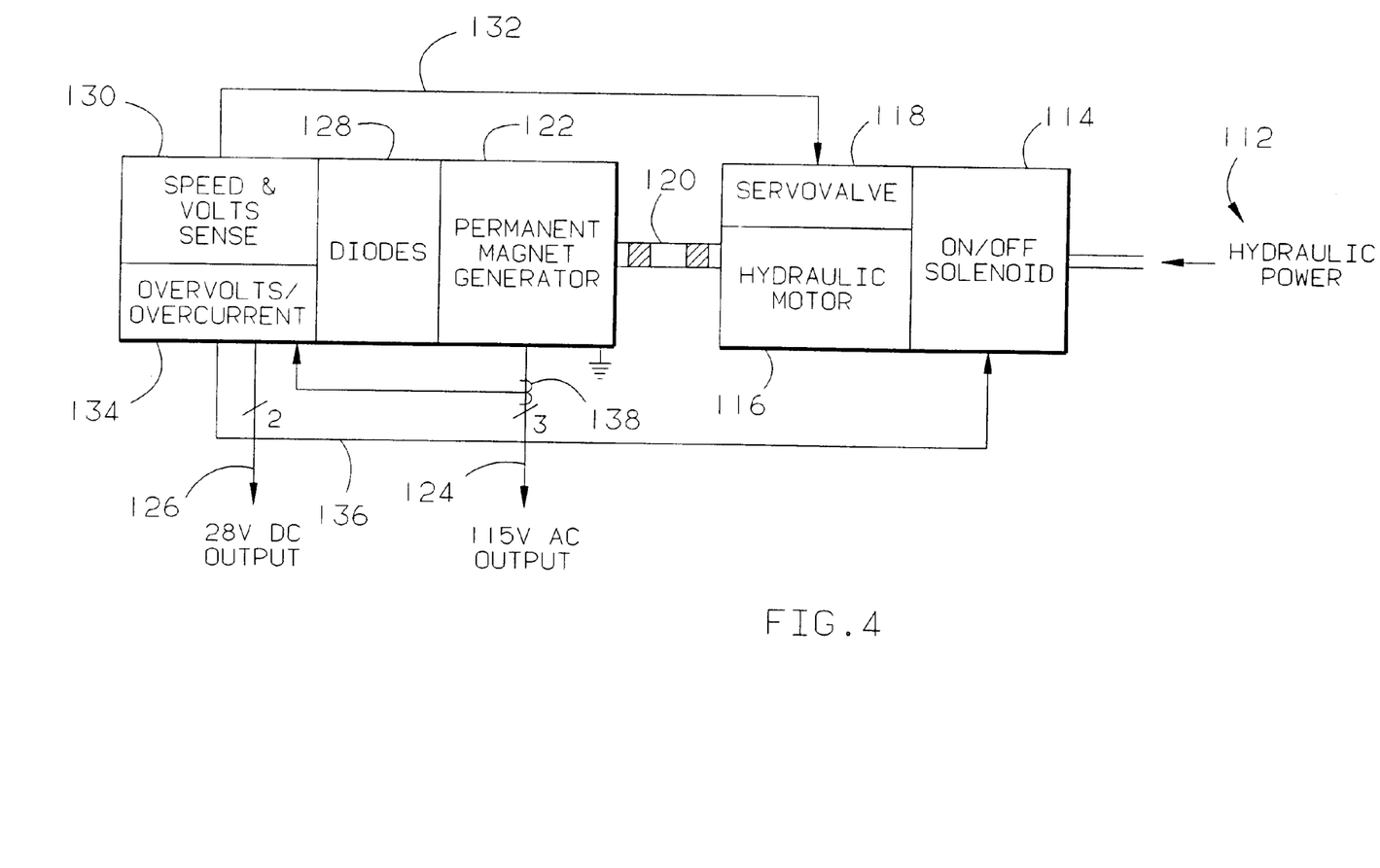
FIG. 4 is a block diagram control schematic of an embodiment of the instant invention.
Figure 5:
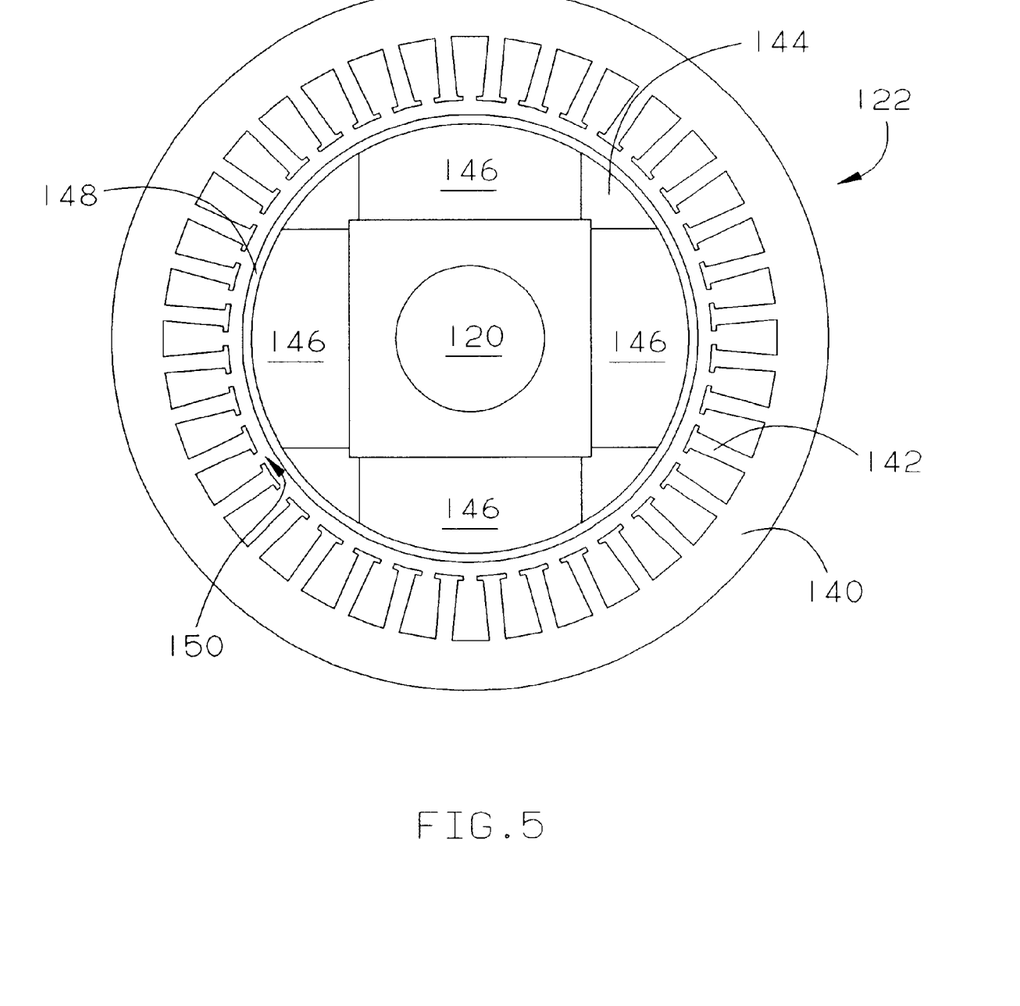
FIG. 5 is a peripheral cross sectional view of a two winding, low reluctance, large airgap permanent magnet generator suitable for use with the embodiment illustrated in FIG. 4.
Figure 6:
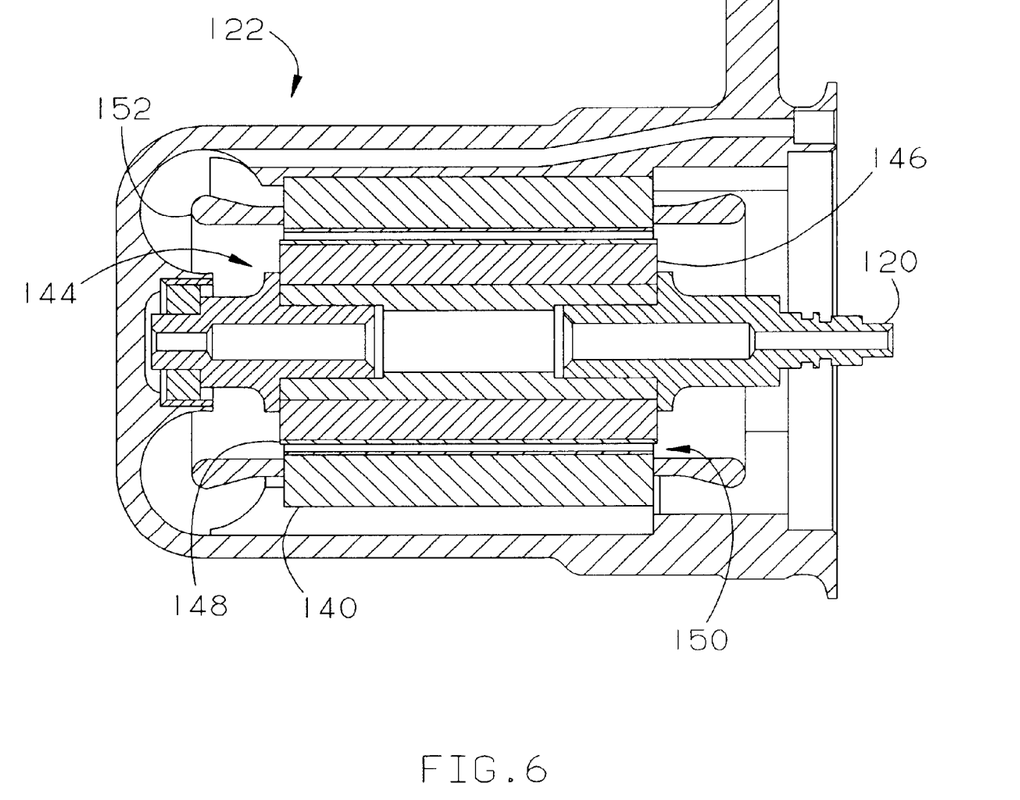
FIG. 6 is a longitudinal cross sectional view of the two winding, low reluctance, large airgap permanent magnet generator of FIG. 5.

An exemplary construction of the PMG 122 of FIG. 4 is illustrated in FIG. 5. As may be seen, the stator 140 of the PMG 122 has a number of salient poles 142 on which are wound the polyphase stator windings (not shown) in a conventional manner. The rotor 144 of the PMG 122 may be of any number of poles, and is illustrated in the exemplary embodiment as having 4 poles. These rotor poles are constructed by using samarium cobalt permanent magnets 146, although other materials may be appropriate as required. A containment ring 148 is utilized in the exemplary embodiment to reduce friction and windage losses, although this ring 148 may be dispensed with depending on system requirements. The containment ring 148 may be of composite or metallic construction. Between the containment ring 148 of the rotor 144 (defining the outer periphery of the rotor 144) and the inner face of the stator poles 142 (defining the inner periphery of the stator 140) is the PMG's air gap 150. Preferably, this air gap 150 is large which reduces the PMG's reactance. As is known in the art, this PMG 122 may be conventionally back-iron or spray-oil cooled using the motor hydraulic fluid (not shown) or, for a small rating machine, the PMG 122 may be flooded. FIG. 6 illustrates a longitudinal cross sectional view of the exemplary PMG 122 of FIG. 5, and illustrates the inclusion of the stator windings 152.

Figure 7:
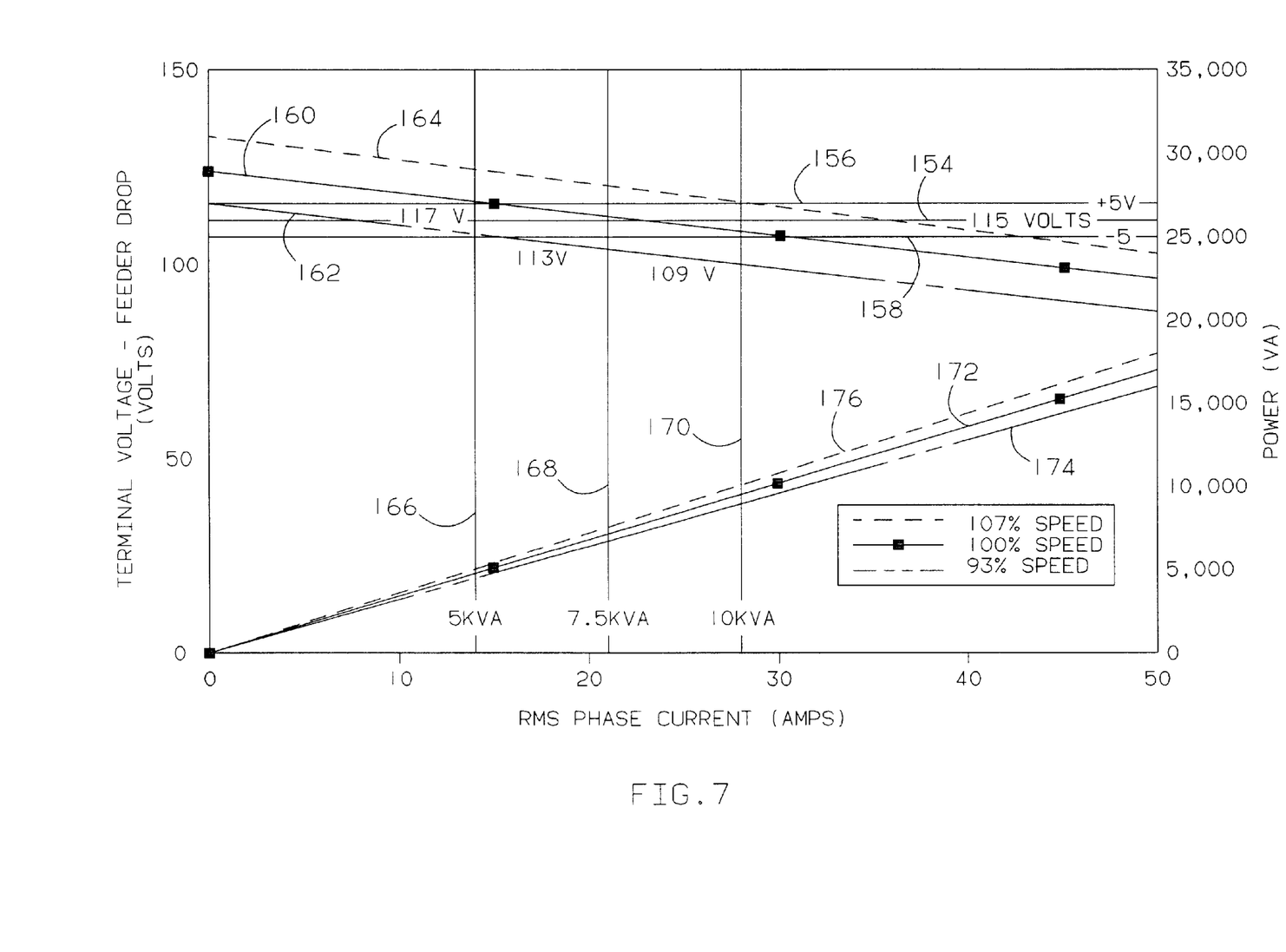
FIG. 7 is a graphical illustration of the AC output voltage and power performance characteristics of the embodiment of the instant invention illustrated in FIG. 4 at 100%, 93%, and 107% speed.
Figure 8:
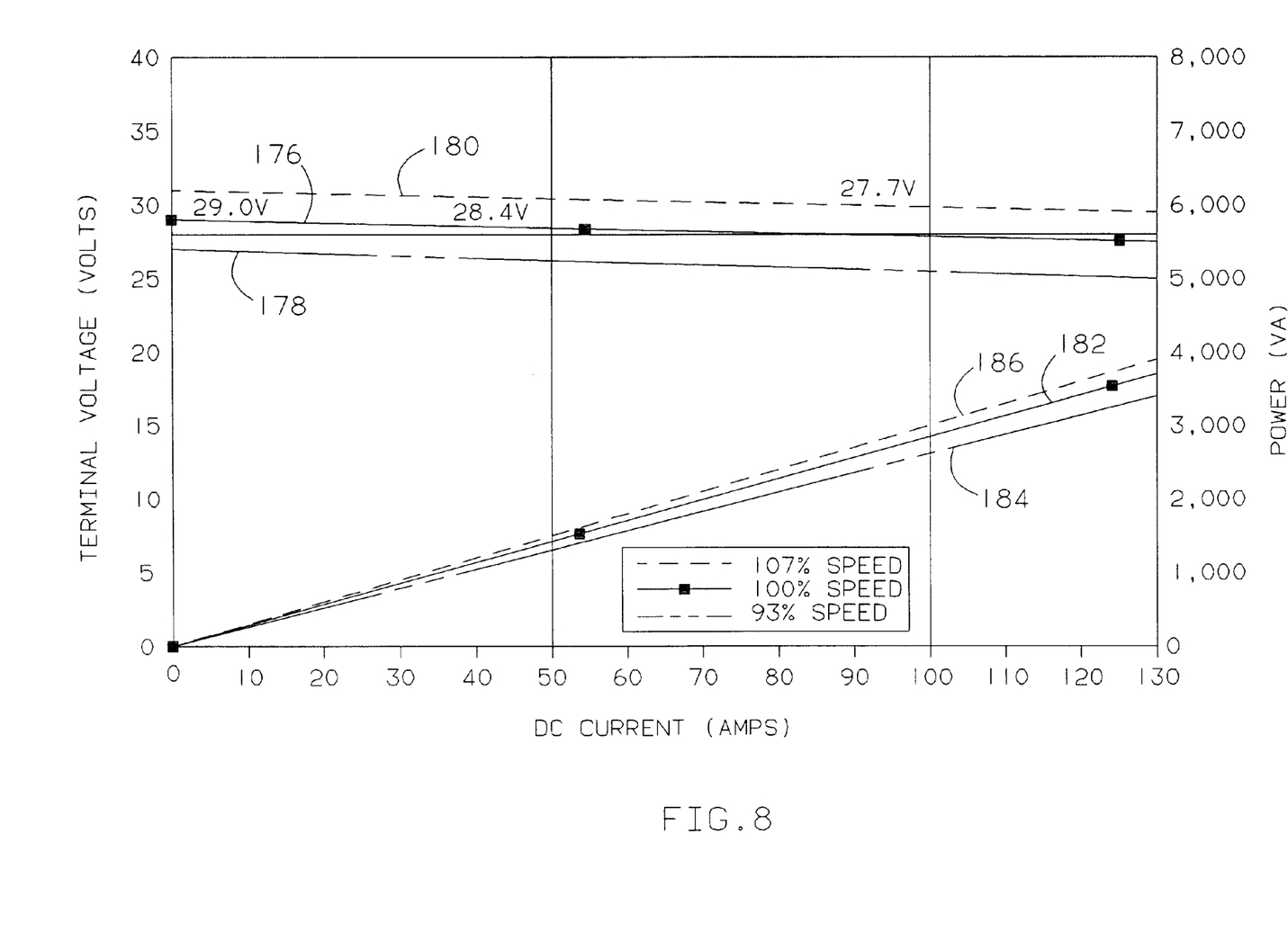
FIG. 8 is a graphical illustration of the DC output voltage and power performance characteristics of the embodiment of the instant invention illustrated in FIG. 4 at 100%, 93%, and 107% speed.

Since the PMG 122 is a low reactance, large airgap machine, its regulation over a load range is low as illustrated by FIG. 7 (for the ac power output 124) and FIG. 8 (for the dc power output 126). As may be seen from FIG. 7, line 154 is the target voltage of 115 volts, and lines 156 and 158 represent the acceptable voltage regulation band under normal operational loading conditions of 120 volts and 110 volts respectively. Trace 160 represents the output voltage characteristic as load is increased from zero at a given operational speed. Trace 162 represents the output voltage characteristic as load is increased from zero at 93% of the given operational speed of trace 160. Trace 164 represents the output voltage characteristic as load is increased from zero at 107% of the given operational speed of trace 160. Vertical line 166 represents the rated output current line, or the 1 per unit current line, vertical line 168 represents the 1.5 per unit current line, and vertical line 170 represents the 2.0 per unit current line. Traces 172, 174, and 176 represent the power output (VI) of the PMG 122 at the given operational speed, 93% speed, and 107% speed, respectively.

As may be seen from an examination of FIG. 7, from zero through light loads the speed of the PMG 122 is kept at the 93% level by servovalve 118 to maintain regulation within acceptable limits. As the load increases, the speed of the hydraulic motor 116 is allowed to increase to maintain regulation within acceptable limits. Beyond the 1.5 per unit level, the speed of the PMG 122 must be increased from the 100% speed to maintain regulation. While FIG. 7 illustrates the output voltage profile at only three speeds, it is to be understood that the control circuitry 130 dynamically adjusts the trim signal 132 to allow the output voltage to be regulated at the desired 115 volt level over the entire required load range.

FIG. 8 illustrates the output voltage regulation at the 100%, 93%, and 107% speeds, as well as the output power at each of these speeds, as the connected dc load is increased over the required range. Trace 176 represents the dc voltage output at the 100% speed level, trace 178 represents the output at the 93% speed level, and trace 180 represents the output at the 107% speed level. As with the ac output 124, this dc output 126 may be maintained at the desired 28 volts dc over the entire desired load range by controlling the servovalve 118 to trim the hydraulic motor's speed by only ±7%. Additionally, since both the ac and dc windings are wound on the same stator, control of one of the outputs, e.g., the ac output 124, also controls the voltage output on the other 126. Due to the low voltage regulation characteristic of the low reactance, large airgap PMG 122, this single output control does not send the other output into a protection zone for over voltage. The output dc power for each of the respective speeds are shown by traces 182, 184, and 186.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. An electric power generating system, comprising:
   a permanent magnet generator (PMG) having a rotor and a stator said stator containing at least one output winding;
   a hydraulic motor drivably coupled to said rotor;
   a servovalve operably coupled to said hydraulic motor; and
   output voltage control means in sensory communication with said output winding and controllably coupled to said servovalve, such that the output voltage control means causes the servovalve to vary the rotor speed of said hydraulic motor in dependence upon a variation in a sensed parameter to maintain said output voltage within predetermined limits.

2. The system of claim 1, wherein said hydraulic motor is driven by an external source of hydraulic power.

3. The system of claim 1, wherein said output voltage control means comprises:
   first means coupled to said output winding for sensing a parameter of power;
   said first means generating an error signal in response to said parameter of power of said permanent magnet generator deviating from a predetermined limit; and
   said servovalve varying the rotor speed of said hydraulic motor in response to said error signal.

4. The system of claim 3, wherein said servovalve varies said speed of said hydraulic motor by approximately ±7%.

5. The system of claim 3, wherein said parameter of power is said output voltage.

6. The system of claim 3, wherein said parameter of power is a frequency of said output voltage.

7. The system of claim 2, further comprising protection means in sensory communication with said output winding for protecting said permanent magnet generator from over-current operation.

8. The system of claim 7, wherein said protection means comprises:
   an output current sense circuit in sensory communication with said output winding for monitoring output current supplied by said permanent magnet generator, said output current sense circuit generating an overcurrent fault signal in response to said output current exceeding a predetermined threshold; and
   supply control means responsive to said overcurrent fault signal and operatively coupled to said hydraulic motor for discontinuing the supply of hydraulic power from said hydraulic motor.

9. The system of claim 8, wherein said supply control means comprises an on/off solenoid.

10. The system of claim 7, wherein said protection means additionally protects the system from over voltage operation of said permanent magnet generator, said protection means additionally comprising a voltage sense circuit in sensory communication with said output winding for monitoring output voltage, said output voltage sense circuit generating an over voltage fault signal in response to said output voltage exceeding a predetermined threshold, and wherein said supply control means is responsive to said over voltage fault signal for disconnecting the supply of hydraulic power from said hydraulic motor.

11. The system of claim 1, wherein said permanent magnet generator further comprises at least a second output winding, the system further comprising a voltage rectifier coupled to said second output winding for generating a rectified dc voltage output.

12. An electric power generating system, comprising:
   a hydraulic motor having a rotor coupled to an external source of hydraulic power;
   a low reactance, large air gap permanent magnet generator (PMG) drivably coupled to said hydraulic motor, said permanent magnet generator generating at least one phase of a given output voltage when driven by said hydraulic motor at a given speed;
   a servovalve operably coupled to said hydraulic motor; and
   output voltage control means for controlling the output voltage of the PMG, said output voltage control means in sensory communication with an output winding of the FMG and controllably coupled to the servovalve such that the servovalve varies the rotor speed of said hydraulic motor in dependence an a sensed parameter to maintain said output voltage within predetermined limits.

13. The system of claim 12, wherein the permanent magnet generator develops output power and wherein the controlling means further comprises:
   protection means for sensing at least one parameter of the output power from said permanent magnet generator, said protection means generating an output protection signal in response to said at least one parameter of output power exceeding predetermined limits; and
   an on/off solenoid operatively coupled between said hydraulic motor and the external source of hydraulic power, said solenoid terminating a flow of hydraulic power to said hydraulic motor in response to said output protection signal.

14. The system of claim 13, wherein said permanent magnet generator generates at least two phases of a given output voltage, and wherein the system further comprises a rectification circuit operatively coupled to at least one of the at least two phases of a given output voltage, said rectification circuit generating a dc voltage output in response thereto.

15. An electric power generating system, comprising:
   a low reactance permanent magnet generator having a rotor and a stator;
   a first and a second set of output phase windings wound on said stator, said first and said second set of output phase windings producing a first and a second voltage output in response to rotation of said rotor;
   rectification means coupled to said second set of stator windings for producing a dc voltage output in response to generation of said second voltage output;
   a hydraulic motor drivably coupled to said rotor for rotating said rotor at a given speed, said hydraulic motor receiving hydraulic power from an external source;
   a voltage control circuit in sensory communication with at least one of said first voltage output and said dc voltage output, said voltage control circuit producing a voltage error signal in response to a monitored voltage deviating from a predetermined target; and
   a servovalve operably coupled to said hydraulic motor and controllably coupled to said voltage control circuit, said servovalve varying said given speed in response to said error signal.

16. The system of claim 15, further comprising:
   output protection circuitry in sensory communication with at least one of said first set of output phase windings and said output of said rectification means for sensing at least a parameter of output power, said output protection circuitry producing a fault protection signal in response to said at least a parameter of output power exceeding predetermined limits; and an on/off solenoid operable coupled between said hydraulic motor and the external source of hydraulic power and controllably coupled to said output protection circuitry, said on/off solenoid stopping a flow of hydraulic power to said hydraulic motor in response to said fault protection signal.

* * * * *